United States Patent
Hussey et al.

(10) Patent No.: US 6,177,749 B1
(45) Date of Patent: Jan. 23, 2001

(54) POLYGONAL SHAFT HOLE ROTOR

(75) Inventors: John H. Hussey, St. Louis, MO (US); John Scott Rose, Alton, IL (US); Jeffrey J. Meystrik, Webster Groves; Kent Lee White, Maryland Heights, both of MO (US)

(73) Assignee: Emerson Electric Co., St. Louis, MO (US)

( * ) Notice: Under 35 U.S.C. 154(b), the term of this patent shall be extended for 0 days.

(21) Appl. No.: 09/190,644

(22) Filed: Nov. 12, 1998

(51) Int. Cl.[7] .............................. H02K 1/06; H02K 1/00; H02K 1/22

(52) U.S. Cl. ..................... 310/217; 310/216; 310/261; 310/42

(58) Field of Search ..................................... 310/216, 217, 310/261, 82, 42; 29/598

(56) References Cited

U.S. PATENT DOCUMENTS

| | | | |
|---|---|---|---|
| 4,127,786 | 11/1978 | Volkrodt | 310/156 |
| 4,484,094 | * 11/1984 | Ade et al. | 310/216 |
| 4,616,151 | 10/1986 | Pryjmak | 310/216 |
| 4,777,397 | 10/1988 | Parshall | 310/156 |
| 5,649,349 | * 7/1997 | Greenway | 310/216 |
| 5,767,607 | * 6/1998 | Kieffer | 310/261 |
| 5,894,182 | * 4/1999 | Saban et al. | 310/217 |

FOREIGN PATENT DOCUMENTS

| | | |
|---|---|---|
| 0 300 436 | 1/1989 | (EP) . |
| WO 98/47215 | 10/1998 | (WO) . |

* cited by examiner

Primary Examiner—Clayton LaBalle
(74) Attorney, Agent, or Firm—Howell & Haferkamp, LC

(57) ABSTRACT

A laminated rotor for an induction motor has a plurality of ferro-magnetic laminations mounted axially on a rotor shaft. Each of the plurality of laminations has a central aperture in the shape of a polygon with sides of equal length. The laminations are alternatingly rotated 180° from one another so that the straight sides of the polygon shaped apertures are misaligned. As a circular rotor shaft is press fit into a stack of laminations, the point of maximum interference occurs at the midpoints of the sides of the polygon (i.e., at the smallest radius of the central apertures of the laminations). Because the laminates are alternatingly rotated, the laminate material at the points of maximum interference yields relatively easily into the vertices (i.e., the greatest radius of the central aperture) of the polygonal central aperture of the next lamination as the shaft is inserted into the stack of laminations. Because of this yielding process, the amount of force required to insert the shaft is reduced, and a tighter fit is achieved.

15 Claims, 3 Drawing Sheets

POLYGONAL SHAFT HOLE ROTOR

BACKGROUND OF THE INVENTION

This invention relates to electric motors in general, and specifically to laminated rotors for induction motors.

The use of laminated rotors for induction motors is well known. See, for example, U.S. Pat. No. 5,767,607, the disclosure of which is herein incorporated by reference. Typically, such a laminated rotor is comprised of a shaft with a center axis and a set of axially-mounted laminations constructed of a ferro-magnetic material.

The laminations of these types of rotors are quite versatile in that they may be sized and configured with punch patterns. Prior art laminations have been punched or stamped with circular shaft holes. Prior art laminations have also been punched with polygonal center holes that are then further machined into circular shaft holes.

Advantages of the laminations, however, are somewhat offset by the difficulties encountered in mounting them to a rotor shaft. Typically, the laminations are provided with a circular shaft hole centered in the lamination disks. A stack of laminations is applied to a circular rotor shaft by a cold press process. The force-fit cold press process presents several challenges to assembling the rotors.

First, the interference between the shaft and the shaft hole is typically about 0.0005 inches. It has been found that this is the largest interference, and hence produces the tightest fit, that permits a cold press application to the shaft. A larger interference will prevent the shaft from being pressed into the shaft hole of a stack of laminations. To achieve this precise fit, the inner diameter of the laminations and/or the outer diameter of the shaft require time consuming and relatively expensive finishing. Consistent machining then becomes a premium, as deviations from optimum finishing causes excessive press forces and mispresses.

Second, the tolerance of the shaft hole in the laminations is typically about 0.0007 inches. These close tolerances also present a challenge in press fitting the laminations onto the shaft so that the laminations are "straight" or perpendicular relative to the shaft. This is typically ensured via employment of a straightness plug gage which is 0.0002 inches below the minimum diameter of the shaft hole. If the laminations are not sufficiently straight relative to the shaft, they will not pass the gage. The assemblies that fail to pass the gage are scrapped.

Third and finally, the success of a cold press fit is critically dependent on the relative temperatures of the rotor shaft and the laminations that the shaft is pressed into. Because of the relative coefficients of thermal expansion between the two materials, variations in temperature between the shaft and the rotor may result in excessively tight or excessively loose fits, both of which have undesirable consequences. Whether the fit is too tight or too loose, the integrity of the rotor may be compromised, the performance of the motor may fluctuate, and the probability of failure of the rotor may be increased.

Therefore, the laminations of the prior art are disadvantaged in that they result in considerable scrap in production of the rotors, produce a wide variety of torque retention of the rotor to the shaft, and consequently produce variation in the performance of the rotor.

SUMMARY OF THE INVENTION

Among the several advantages of the present invention may be noted the provision of a laminated rotor where the shaft hole of the laminations may be punched to size without the need for expensive, time consuming finishing; the provision of a laminated rotor where the torque retention of the laminations to the rotor shaft is increased; the provision of a laminated rotor wherein the forces required to press the rotor laminations onto the shaft are reduced; and the provision of a laminated rotor that reduces the scrap generated in manufacturing and assembly of the rotor.

Generally the present invention comprises a laminated rotor in which the ferro-magnetic laminations are punched with a central aperture in the shape of a polygon, as opposed to the circular apertures of the laminations of the prior art. The polygonal aperture has an odd number of straight sides of substantially equal length, each of which extends between vertices formed by the intersecting sides of the polygon. A plurality of laminations are stacked upon one another to form a rotor shell. Each lamination is slightly rotated about the axis of the rotor shaft from the next lamination in the stack.

In the preferred embodiment, the laminations are of at least two different groups stacked along the shaft. Every other lamination of the stack belongs to one of the groups, while the remaining laminations belong to the other group. Thus, the stack of laminations consists of pairs of laminations, one from each of the groups. One of the groups of laminations is rotated relative to the other group so that the central polygonal apertures of the groups of laminations are directly opposed (i.e. rotated 180° from one another). In other words, considering a single pair of adjacent laminations, the two laminations are rotated relative to one another so that the vertices of the polygonal apertures of one of the laminations are positioned in between, and approximately equidistant from, adjacent vertices of the other lamination. Thus, the interior of the rotor shell has a uniform honeycomb-like appearance due to the relative rotations of the laminations.

In alternate embodiments, the laminations are of three or more different groups stacked along the shaft in a sequential arrangement. The laminations of each group are rotated relative to the laminations of the other groups so that the vertices of the polygon shaft holes of each group are positioned in between adjacent vertices of the polygon shaft holes of the other groups.

The stack of laminations is die cast, forming a squirrel cage winding through slots near the outer periphery of the lamination disks. End rings are then placed on the ends of the stack and the rotor shell is completed.

The rotor shaft is then press fit into the rotor shell via a cold press process. Due to the relative material hardness between the laminations and the steel rotor shaft, the laminations yield as the shaft is pressed into the interior of the rotor. The honeycomb-like structure of the interior of the rotor shell provides relatively little resistance to the shaft. As the shaft is inserted, the greatest interference occurs at the smallest radius of the shell interior (i.e., at the midpoints of the sides of the polygonal apertures). At these particular points, the laminate material yields relatively easily as only a single thickness of a laminate opposes the insertion of the shaft. The yielded laminate material fills in the spaces or cells of the honeycomb created by the vertices of the next lamination immediately below. Thus, the force required to insert the shaft is noticeably less. However, this yielding process occurring all around the shaft actually produces a stronger bond than is achieved with the conventional press fit process using laminates with circular apertures as in the prior art. The nominal interference between the shaft and the rotor shell is dramatically increased.

Also because of the yielding of the laminates into the honeycomb structure of the rotor shell, expensive machining of the laminations is avoided. Thus, comparatively speaking, a rotor of the present invention can be manufactured in less time with lesser expense than the rotors of the prior art. Further, because the force necessary to insert the rotor shaft is reduced, the instances of mispresses due to the generation of excessive forces will decline, and the amount of scrap generated during manufacture of the rotor will be accordingly reduced. Finally, the yielding of the laminations reduces the impact of the tolerances in the central apertures of the laminations, and further reduces the impact of relative temperature differences between the rotor shaft and the laminations.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
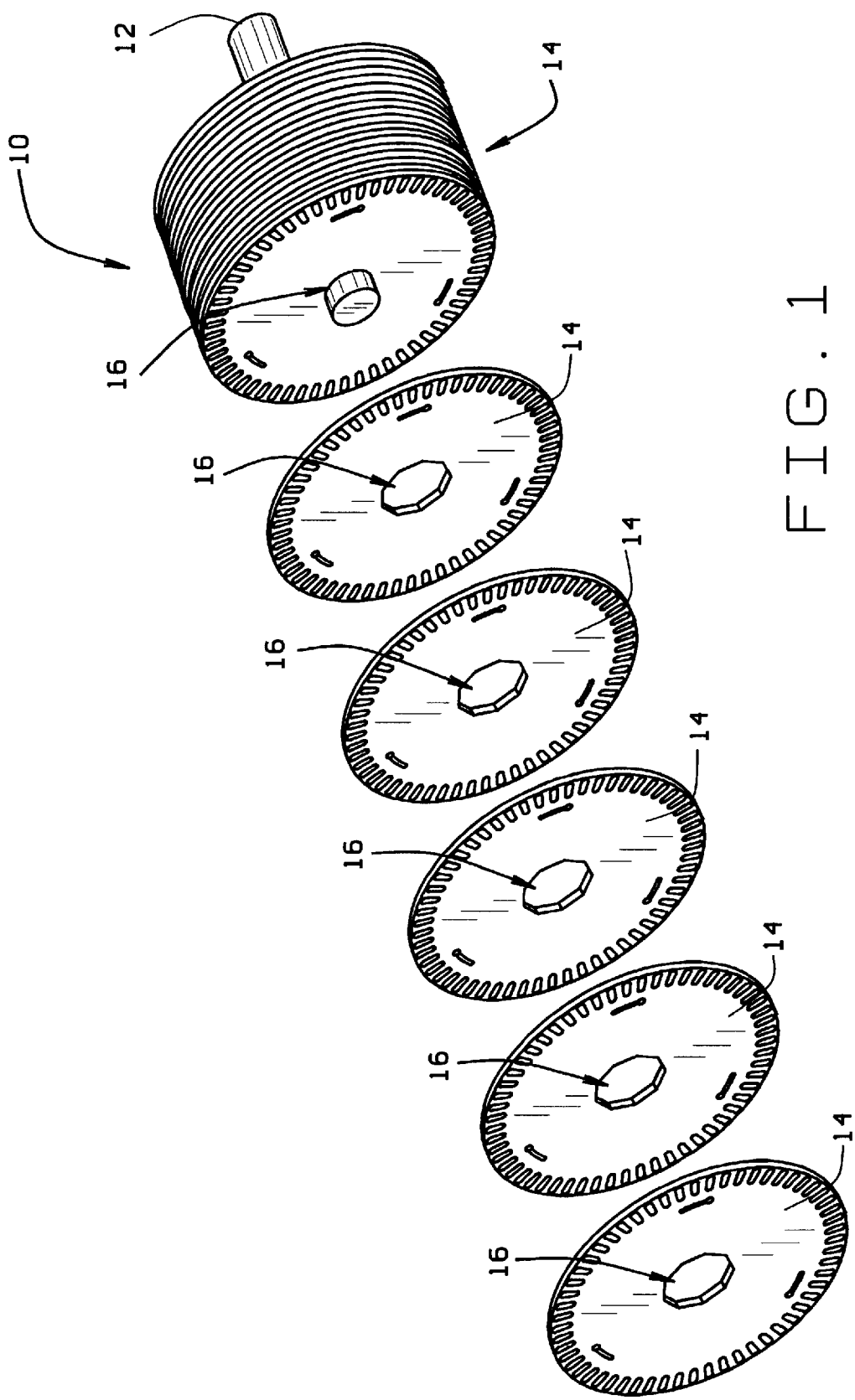
FIG. 1 is a perspective view of a portion of a laminated rotor according to the present invention.

Referring now to the drawings, a portion of a laminated rotor of the present invention is shown in FIG. 1 and is generally designated by the reference numeral 10. An elongated circular rotor shaft 12 has a plurality of laminations 14 mounted to the shaft along the longitudinal center axis of the shaft. The disk shaped laminations 14 are made of a ferro-magnetic material and are mounted substantially perpendicular to the shaft 12 by the process described below.

As is evident from FIG. 1, the laminations have centrally located apertures 16 to receive the rotor shaft 12. The laminations 14 are generally solid (i.e., have only a central aperture in the inner portion of the laminations that is dimensioned to receive the rotor shaft 12), but the laminations may easily be punched to form different cross sections to satisfy various objectives. It is understood that these various types of laminations may be used separately or in combination to practice the invention. For ease of discussion, only laminations of the type shown in FIG. 1 will be discussed hereinafter.

Figure 2:
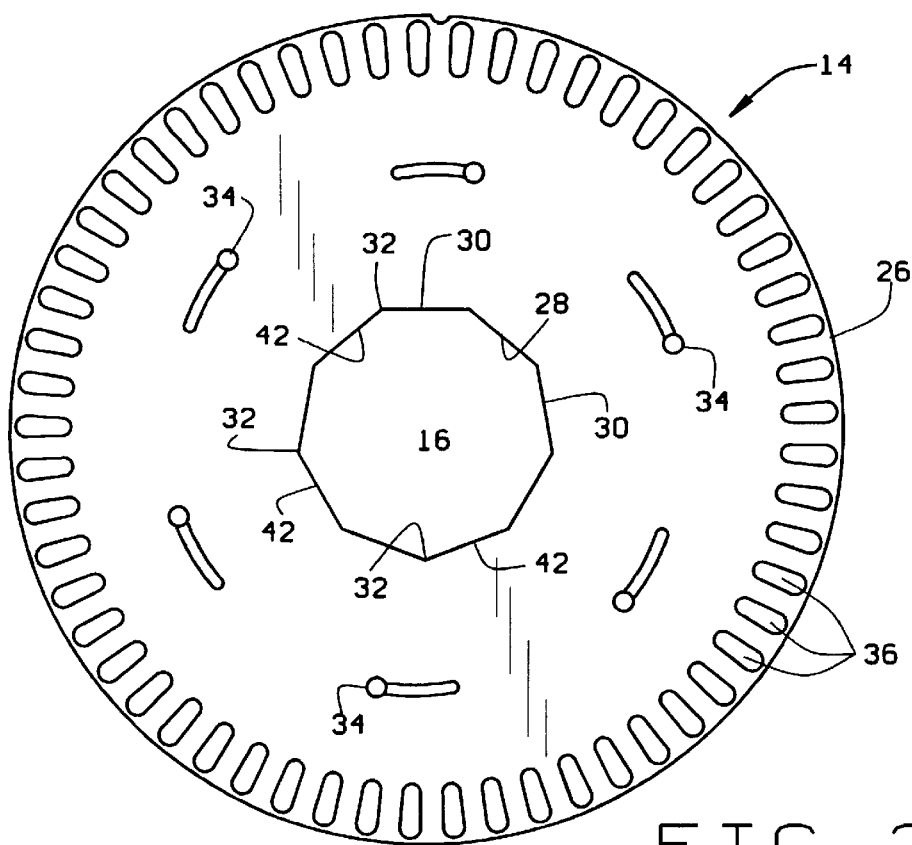
FIG. 2 is a top view of a lamination of the present invention.

Referring now to FIG. 2, a ferro-magnetic lamination according to the present invention is generally designated by the reference numeral 14. The lamination is relatively thin and has a circular outer periphery 26 and a centrally located aperture 16 to receive a rotor shaft. The punched centrally located aperture 16 is appropriately sized to fit a rotor shaft 12, and generally has the shape of a polygon. The polygon-shaped apertures are measured with "go" and "no go" gages to ensure the apertures are appropriately sized to adequately fit the rotor shaft. The boundary of the aperture 16 defines an inner periphery 28 of the lamination, and consists of a plurality of straight sides 30 that are substantially equal in length. The sides 30 of the inner periphery 28 intersect at points or vertices 32.

The inventors have found that a nonagon, or a nine sided, shaped aperture 16 works particularly well in forming a good fit with the rotor shaft, as described below. It is understood, however, that the polygon shaped aperture 16 could have a number of sides greater or fewer than nine and still achieve the advantages of the invention. Likewise, while the sides of the polygon are preferably substantially equal in length, sides of different lengths may be used to practice the invention.

Moving away from the central aperture 16, the lamination 14 has a plurality of interlock tabs 34 to hold the lamination in position relative to another lamination when they are stacked to form a rotor shell. However, the relative rotation between adjacent laminations could be random. Therefore, the interlocks 34 are not necessary to practice the invention. Near the outer periphery 26 of the lamination 14 is a plurality of evenly spaced slots 36 to receive a rotor winding (not shown).

Figure 3:
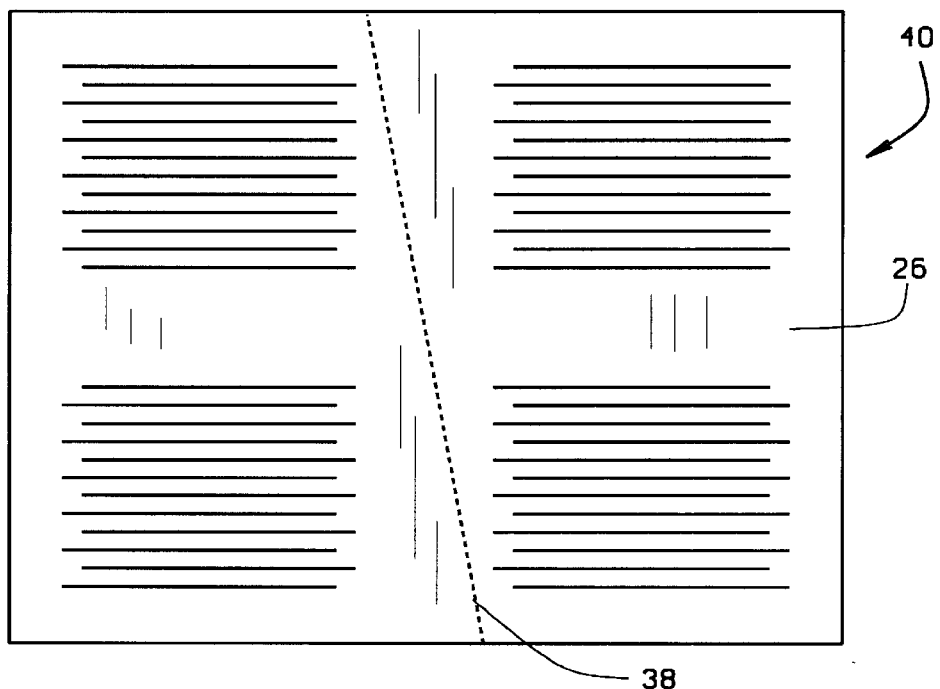
FIG. 3 is a representation of a side view of a stack of laminations of the present invention.

Once the laminations are formed and the central apertures 16 are punched, the laminations are ready for assembly. Referring now to FIG. 3, a plurality of laminations are stacked upon one another to form a rotor shell 40. Each lamination in the stack is positioned relative to the adjacent lamination(s) so that they appear to be rotated 180°. A point on the periphery of each lamination, for example the notch 38 shown in FIG. 2, would appear as a diagonal line on the exterior of the rotor shell 40 as shown in FIG. 3.

Therefore, the stack of laminations consists of two principal alternating groups of substantially aligned laminations which appear to be rotated 180° from one another. It is recognized that other groups of laminations may be employed in addition to the two groups described. Because the polygon shaped central aperture 16 has an odd number of sides, the relative rotation causes the straight sides 30 and points or vertices 32 of the inner periphery 28 of the central apertures 16 of the two groups to be misaligned or radially offset (i.e. rotated relative to one another). Consequently, the vertices 32 of the two groups of laminations are substantially equidistant from one another. In other words, the rotational offset or gap between any two adjacent vertices 32 of the two groups is maximized because further rotation of one of the groups would bring other vertices closer together.

In alternate embodiments, the laminations are of three or more different groups stacked along the shaft in a sequential arrangement. The laminations of each group are rotated relative to the laminations of the other groups so that the vertices of the polygon shaft holes of each group are positioned in between adjacent vertices of the polygon shaft holes of the other groups.

Figure 4:
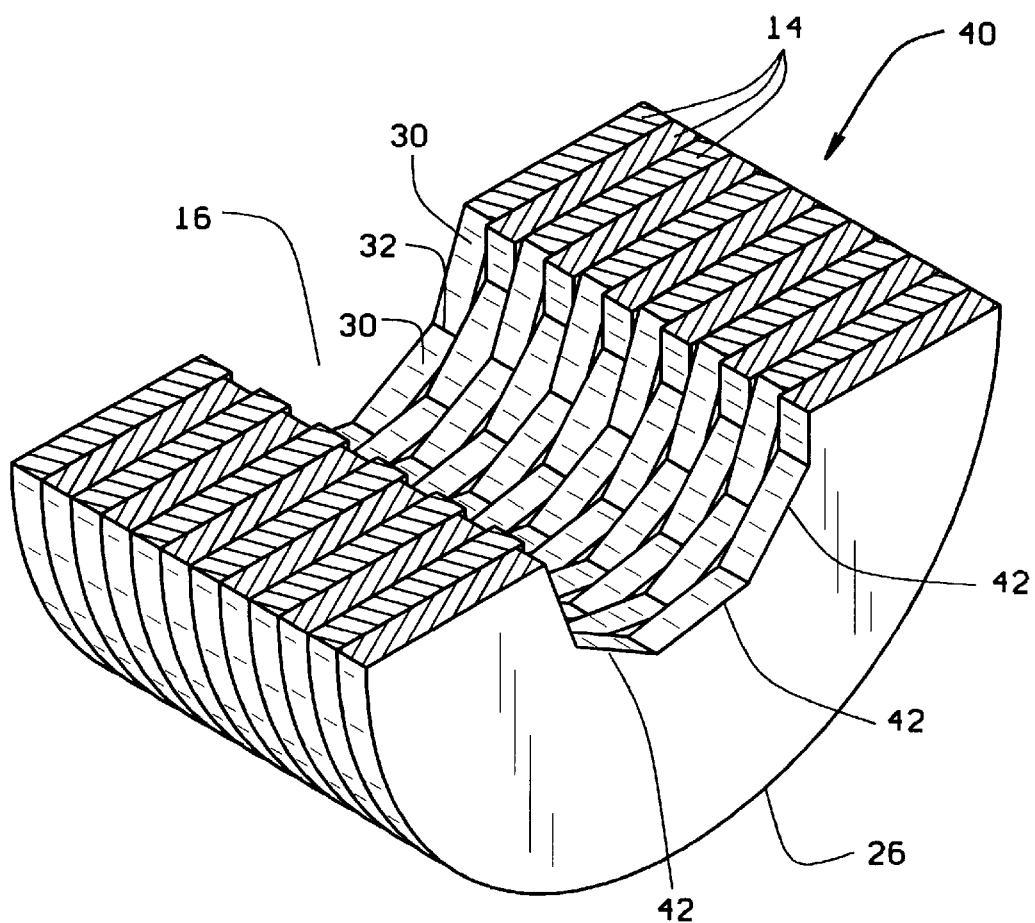
FIG. 4 is an enlarged cross-sectional view of a stack of laminations of the present invention.

It is seen in FIG. 4 that the midpoints 42 of the sides 30 of one of the groups of laminations is rotationally aligned with the adjacent vertices 32 of the other group of laminations. Therefore, considering a pair of laminations, the vertices 32 of one of the laminations correspond in position to the midpoints 42 of the sides 30 of the aperture 16 of the other lamination. Thus, the interior of the rotor shell 40 has a uniform honeycomb-like appearance due to the relative rotations of the two groups of laminations. The vertices 32 of a laminate form cells or depressions between the sides 30 of immediately adjacent laminations.

Once assembled in this fashion, the stack of laminations 40 is die cast, forming a squirrel cage winding through the slots 36 near the outer periphery 26 of the laminations 14. Assembly of the rotor shell 40 is then completed by attaching end rings (not shown) on either end of the rotor shell.

The rotor shell 40 is now mated with the rotor shaft 12 via a cold press process. Due to the relative material hardness between the laminations 14 and the steel rotor shaft 12, the laminations yield as the shaft 12 is pressed into the interior of the rotor shell 40 and through the polygonal apertures 16 of the laminations. As the shaft 12 is inserted into the rotor shell 40, the maximum interference occurs at the smallest radius of the rotor shell interior (i.e., at the midpoints 42 of the sides 30 of the polygonal apertures 16). At the midpoints 42, the laminate 14 material yields relatively easily as only a single thickness of a laminate opposes the insertion of the shaft 12. The displaced laminate material from the midpoints 42 of the sides 30 of a lamination 14 fills in the void areas adjacent vertices 32 of an immediately adjacent lamination as the shaft 12 is pressed into the rotor shell 40. This process occurs lamination by lamination until the shaft 12 is fully inserted into the rotor shell 40, thereby completing the assembly of the rotor.

Therefore, the press fit of the rotor shaft 12 into the rotor shell 40 is relatively smooth when compared to a rotor shell constructed of laminations of the prior art. Further, because the configuration of the rotor shell 40 places the greatest interference between the shell 40 and the rotor shaft 12 at the midpoints 42 of the sides 30 of the central apertures 16, the force required to insert the rotor shaft 12 is noticeably less because the lamination material may yield at these points and displace into the vertices 32 of adjacent laminations. Moreover, this yielding process of the laminates 14 occurring all around the rotor shaft 12 actually produces a stronger bond than is achieved with the conventional press fit process using laminates with circular apertures as in the prior art. The nominal interference between the rotor shaft 12 and the rotor shell 40 is increased from 0.0005 inches in the prior art to 0.003 inches and the yielding and displacement of material increases the actual interference from 0.0026 inches in the prior art to 0.0076 inches.

Therefore, the laminates of the present invention achieve a better press fit between the rotor shell and the rotor shaft than the rotors of the prior art while at the same time reducing the amount of force needed to insert the shaft and easing the assembly of the rotor. Thus, instances of mispresses and excessive forces developed during the insertion of the shaft, and the corresponding scrap material produced during these events is accordingly reduced. Also, because of the yielding of the laminates into the honeycomb structure of the rotor shell, expensive machining of the laminations is avoided. Finally, the increased nominal interference between the apertures 16 of the laminates and the rotor shaft 12 mitigates the impact of temperature differences between the rotor shaft and the rotor shell during assembly. Thus, comparatively speaking, a rotor of the present invention can be manufactured more quickly, more easily and less expensively than the rotors of the prior art.

While the present invention has been described by reference to a specific embodiment, it should be understood that modifications and variations as would be apparent to one of ordinary skill in the art are within the scope of the invention which is limited solely by the claims and their equivalents.

What is claimed is:

1. A laminated rotor for an induction motor comprising:
  a circular shaft having a center axis;
  a plurality of laminations of a ferro-magnetic material mounted axially on the shaft;
  each lamination of the plurality of laminations has a centrally located polygonal aperture;
  each polygonal aperture has a plurality of sides of a substantially equal length;
  each of the sides of the polygonal aperture has a midpoint; and
  the midpoints of one lamination of a pair of adjacent laminations are equidistant from at least two midpoints of the other lamination of the pair of adjacent laminations.

2. The laminated rotor of claim 1 wherein the polygonal apertures have nine sides.

3. The laminated rotor of claim 1, wherein:
  the polygonal apertures have an equal odd number of sides.

4. A laminated rotor for an induction motor comprising:
  a circular shaft having a center axis;
  at least first and second groups of pluralities of ferro-magnetic laminations mounted axially on the shaft, the laminations of the at least first and second groups of laminations being interspersed with one another so that adjacent laminations are of different groups;
  each lamination of the plurality of laminations in the first and second groups has a centrally located aperture with at least one straight side; and
  the straight sides of the first group are substantially aligned, the straight sides of the second group are substantially aligned; and the straight sides of the first group are misaligned with the straight sides of the second group.

5. The laminated rotor of claim 4 wherein the centrally located apertures of the first and second groups have the same shape.

6. The laminated rotor of claim 5 wherein the apertures of at least one of the first and second groups are polygons.

7. The laminated rotor of claim 6 wherein the laminations of at least one of the first and second groups of laminations each has a polygonal aperture with nine sides.

8. The laminated rotor of claim 4 wherein each of the apertures has a plurality of angles with vertices, and the vertices of the laminates of the first group are substantially equally spaced from the vertices of the laminates of the second group.

9. A laminated rotor for a motor comprising:
  a circular shaft having a center axis;
  a plurality of laminations mounted axially on the shaft;
  each lamination of the plurality of laminations has a centrally located polygonal aperture, each polygonal aperture has a plurality of sides of a substantially equal length and each of the sides has a midpoint, and each polygon aperture has a plurality of vertices at intersections of the plurality of sides; and
  the midpoints and vertices of adjacent laminations of the plurality of laminations are axially aligned.

10. The laminated rotor of claim 9, wherein:
each polygonal aperture has an odd number of sides.

11. The laminated rotor of claim 9, wherein:
each polygonal aperture has an equal number of sides.

12. The laminated rotor of claim 9, wherein:
each polygonal aperture has a total number of nine sides.

13. The laminated rotor of claim 9, wherein:
the polygonal apertures have a shape that is substantially the same.

14. The laminated rotor of claim 9, wherein:
the plurality of laminations consists of first and second groups of laminations, the sides of the polygonal apertures of the first group of laminations are substantially aligned, the sides of the polygon apertures of the second group of laminations are substantially aligned, and the sides of the polygonal apertures of the first group are misaligned with the sides of the polygonal apertures of the second group.

15. The laminated rotor of claim 14, wherein:
each polygonal aperture has an equal number of sides.

* * * * *